United States Patent [19]

Mitsuhira

[11] Patent Number: 5,365,183

[45] Date of Patent: Nov. 15, 1994

[54] SINGLE CHIP MICROCOMPUTER HAVING TWO KINDS OF TIMER FUNCTIONS

[75] Inventor: Yuko Mitsuhira, Kanagawa, Japan

[73] Assignee: NEC Corporation, Tokyo, Japan

[21] Appl. No.: 951,866

[22] Filed: Sep. 28, 1992

[30] Foreign Application Priority Data

Sep. 30, 1991 [JP] Japan .................................. 3-250919

[51] Int. Cl.⁵ .............................................. H03K 5/15
[52] U.S. Cl. ...................... 327/144; 377/39; 377/44; 327/295; 327/392
[58] Field of Search ...................... 377/39, 44; 328/61, 328/62; 307/271

[56] References Cited

U.S. PATENT DOCUMENTS

| | | | |
|---|---|---|---|
| 4,096,396 | 6/1978 | Belforte et al. | 328/62 |
| 4,276,468 | 6/1981 | Nagamoto et al. | 377/39 |
| 4,297,567 | 10/1981 | Herzner | 377/71 |
| 4,566,111 | 1/1986 | Tanagawa | 377/39 |
| 4,870,665 | 9/1989 | Vaughn | 328/61 |

Primary Examiner—John S. Heyman
Attorney, Agent, or Firm—Whitham, Curtis, Whitham & McGinn

[57] ABSTRACT

A single chip microcomputer includes two kinds of timer circuits which receive a common clock signal. One of the timer circuits generates a first timer signal, and the other generates a second timer signal. When the first timer signal is being reset, the second timer signal is inactive.

20 Claims, 12 Drawing Sheets

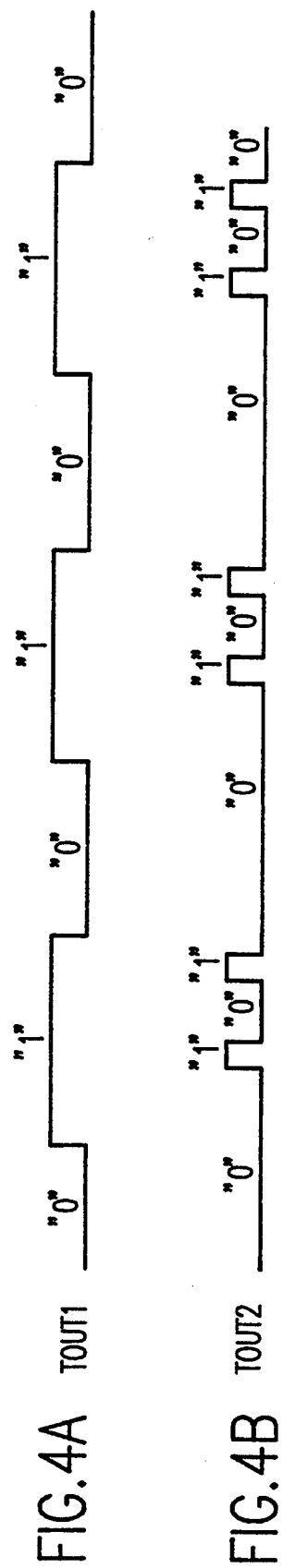

SINGLE CHIP MICROCOMPUTER HAVING TWO KINDS OF TIMER FUNCTIONS

BACKGROUND OF THE INVENTION

1. Field of the Invention

The present invention relates to a microcomputer having two kinds of timer functions incorporated into a single chip.

2. Description of the Related Art

A single chip (or one-chip) microcomputer includes not only a central processing unit (CPU), but also a random access memory (RAM), a read-only memory (ROM), and other peripheral circuits which include an interrupt controller, a direct memory access (DMA) controller, a serial interface, and a timer, to thereby carry out various functions.

On the other hand, for example, in a current control system for printheads, two kinds of timer outputs may be required. In this case, only when one of the timer outputs is being set, can the other be set and reset.

In the prior art, since each single chip microcomputer has only one timer function, two single chip microcomputers are provided to generate the above-mentioned two kinds of timer outputs, thus increasing the cost. Also in this case, in order to maintain the above-mentioned relationship between the two timer outputs, one of the microcomputers has to generate interrupt signals and transmit them to the other, which creates a time lag in operation between the two microcomputers, i.e., between the two timer outputs. As a result, an accurate phase relationship between the two timer outputs can not be expected due to this timer lag, which will be explained in more detail.

Also, another external timer circuit may be connected to a single chip microcomputer, thereby obtaining two kinds of timer functions. However, in this case also, since controlling the external timer circuit by using the microcomputer is complex, an accurate phase relationship between the two timer outputs can not be expected, similar to the above-mentioned two microcomputer system.

SUMMARY OF THE INVENTION

It is, therefore, an object of the present invention to reduce the cost of a microcomputer system for generating two kinds of timer outputs.

It is another object of the present invention to realize an accurate phase relationship between the two kinds of timer outputs.

According to the present invention, two kinds of timer circuits are incorporated into a single chip microcomputer. That is, a first timer circuit is used for generating a first timer output, and a second timer circuit is used for generating a second timer output. When the first timer circuit is being reset, i.e., when the first timer output is being reset, the second timer circuit is disabled, so that the second timer output is inactive. Both the first and second timer circuits receive a common clock signal to thereby maintain an accurate phase relationship between the two timer outputs.

BRIEF DESCRIPTION OF THE DRAWINGS

The present invention will be more clearly understood from the description as set forth below, as compared with the prior art, with reference to the accompanying drawings, wherein:

FIGS. 4A and 4B are timing diagrams showing two kinds of timer outputs;

DESCRIPTION OF THE PREFERRED EMBODIMENT

Before the description of an embodiment of the present invention, prior art microcomputers will be explained with reference to FIGS. 1 through 5.

Figure 1:
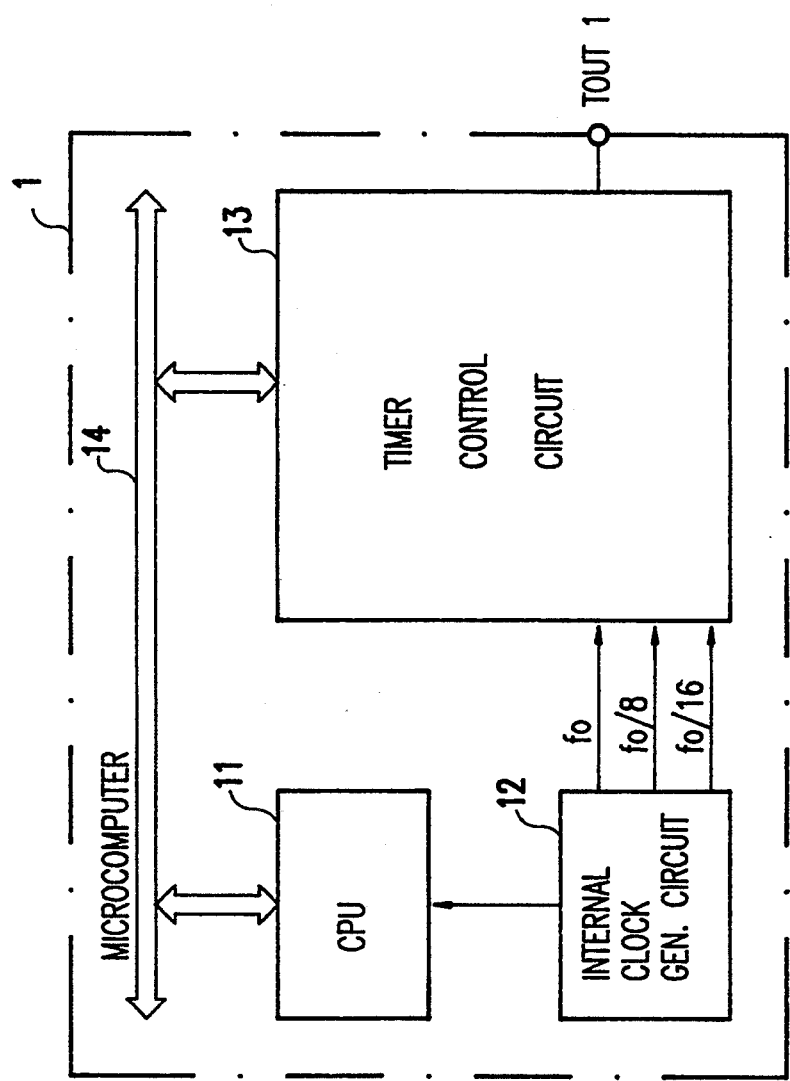
FIG. 1 is a block circuit diagram illustrating a prior art single chip microcomputer.

In FIG. 1, which illustrates a prior art single chip microcomputer, a single chip microcomputer 1 includes a CPU 11, an internal clock generating circuit 12, a timer control circuit 13, an internal bus 14, and the like.

The CPU 11 includes a program counter (PC), a program status word (PSW), an arithmetic and logic unit (ALU), various registers, and the like, to carry out various instructions. Also, the CPU 11 controls the timer control circuit 13 via the internal bus 14.

The internal clock generating circuit 12 generates various clock signals and transmits them to the CPU 11, the timer control circuit 13, and other peripheral circuits, to operate them. For example, the internal clock generating circuit 12 generates an operation clock and transmits it to the CPU 11. Also, the internal clock generating circuit 12 generates three clock signals having frequencies fo, fo/8, and fo/16, respectively, where fo is the frequency of a system clock signal, and transmits them to the timer control circuit 13, thereby dynamically changing the frequency (period) of a timer output TOUT1 of the timer control circuit 13. Note that other external clock signals can be supplied via the input interfaces (not shown) to the timer control circuit 13.

Figure 2:
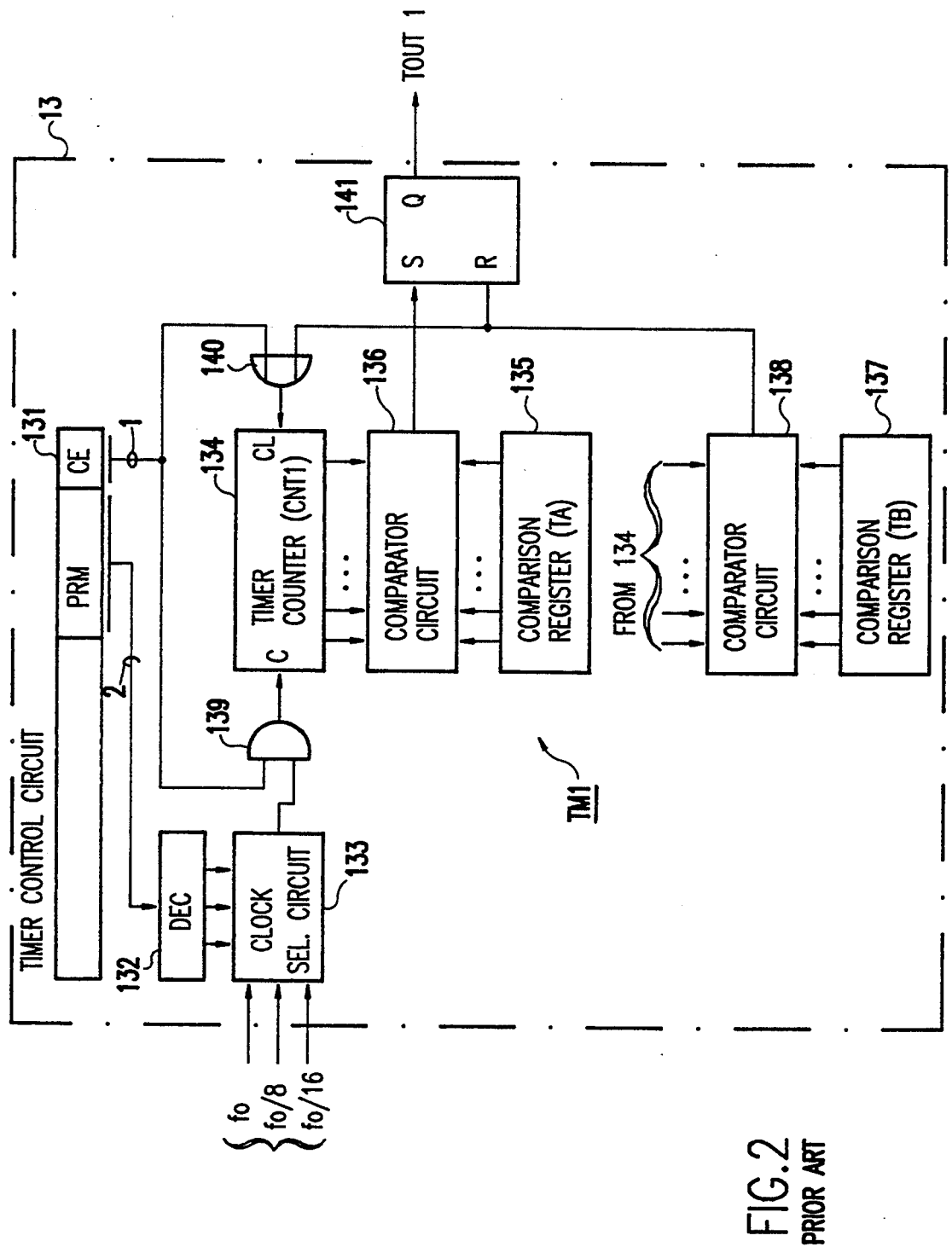
FIG. 2 is a detailed block circuit diagram of the timer control circuit of FIG. 1.

In FIG. 2, which is a detailed block circuit diagram of the timer control circuit 13 of FIG. 1, reference numeral 131 designates a control register for storing 2-bit processor mode (PRM) data, 1-bit clock enable (CE) data, and other control data for various portions of the timer control circuit 13. Such data is written into its corresponding areas via the internal bus 14.

The processor mode data PRM is supplied to a decoder 132 which, in turn, decodes the processor mode data PRM to supply a 3-bit decoding signal to a clock selection circuit 133. As a result, the clock selection circuit 133 selects one of the clock signals fo, fo/8, and fo/16 and supplies it to a timer circuit TM1.

The timer circuit TM1 includes a timer counter 134 for counting a time duration CNT1, a comparison register 135, a comparator circuit 136 for comparing the value (CNT1) of the timer counter 134 with the value (TA) of the comparison register 135, a comparison register 137, and a comparator circuit 138 for comparing the value (CNT1) of the timer counter 134 with the value (TB) of the comparison register 137. The values TA and TB of the comparison registers 135 and 137 are written by the CPU 11.

When the clock enable data CE stored in the control register 131 is logic "1" to pass the selected clock signal by the clock selection circuit 133 through an AND circuit 139, the timer counter 134 is incremented by +1 by receiving each pulse of the selected clock signal. Also, when the clock enable signal CE stored in the control register 131 is switched from "0" (inactive state) to "1" (active state), the timer counter 134 is cleared due to the presence Of an OR circuit 140. Further, when the comparator circuit 138 generates a coincidence signal indicating that the value (CNT1) of the timer counter 134 has reached the value (TB) of the comparison register 137, the timer counter 134 is also cleared due to the presence of the OR circuit 140.

Also, the timer circuit TM1 includes an RS flip-flop 141 which is set by the coincidence signal of the comparator circuit 136 and is reset by the coincidence signal of the comparator circuit 138.

The operation of the timer control circuit 13 of FIG. 2 will be explained with reference to FIGS. 3A, 3B, and 3C. Before time $t_0$, the processor mode data PRM of the control register 131 and the values TA and TB (<TA) are set in advance in the comparison registers 135 and 137 by the CPU 11. Also, in this state, the timer output TOUT1 of the flip-flop 141 is indefinite (i.e., undecided), since it depends on the state of the flip-flop 141. Further, in this state, the value CNT1 of the timer counter 134 is suspended, since the clock signal does not pass through the AND circuit 139.

Figures 3A, 3B, 3C:
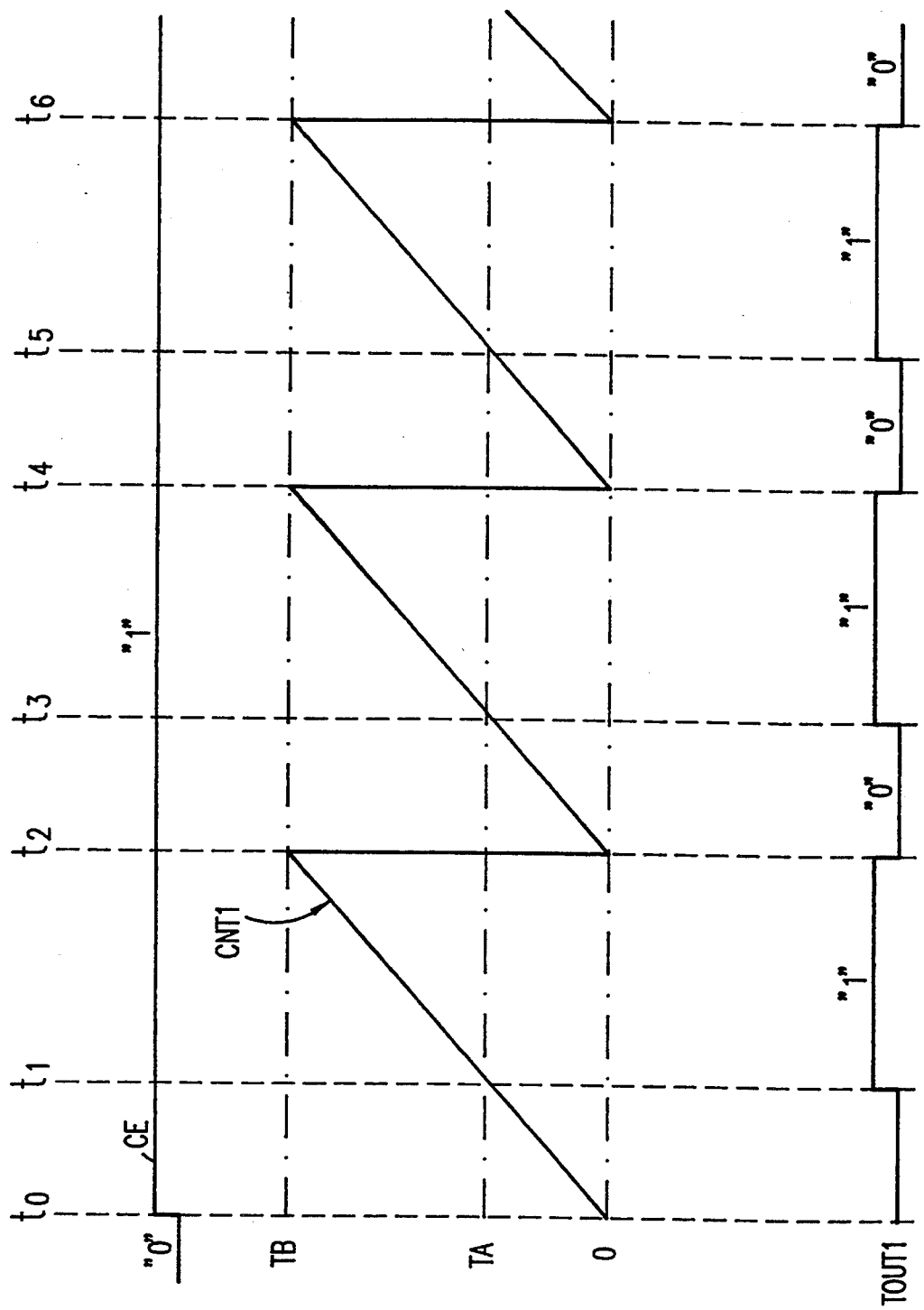
FIGS. 3A, 3B, and 3C are timing diagrams showing the operation of the timer control circuit of FIG. 2.

At time $t_0$, when the clock enable data CE of the control register 131 is switched from "0" to "1" as shown in FIG. 3A, the value CNT1 of the timer counter 134 is cleared by the OR circuit 140, and the timer counter 134 begins counting the selected clock signal via the AND circuit 139, as shown in FIG. 3B.

Before time $t_1$, since the value CNT1 of the timer counter 134 does reach the value TA of the comparison register 135 as shown in FIG. 3B, the state of the flip-flop 141 is unchanged and remains in its previous state which is "0" or "1".

At time $t_1$, the value CNT1 of the value TA of the comparison register 135 is as shown in FIG. 3B, so that the comparator circuit 136 generates a coincidence signal to set the flip-flop 141. Therefore, the timer output TOUT1 is determined to be "1", as shown in FIG. 3C.

Before time $t_2$, since the value CNT1 of the timer counter 134 does reach the value TB of the comparison register 137 as shown in FIG. 3B, the state of the flip-flop 141' is unchanged and remains in its previous state "1".

At time $t_2$, the value CNT1 of the timer counter 134 reaches the value TB of the comparison register 135 as shown in FIG. 3B, so that the comparator circuit 138 generates a coincidence signal to reset the flip-flop 141. Therefore, the timer output TOUT1 is switched from "1" to "0", as shown in FIG. 3C. Simultaneously, the value CNT1 of the timer counter 134 is cleared by the coincidence signal of the comparator circuit 138 via the OR circuit. 140, as shown in FIG. 3B.

At time $t_2$, the value CNT1 of the timer counter 134 again reaches the value TA of the comparison register 135 as shown in FIG. 3B, so that the comparator circuit 136 generates a coincidence signal to set the flip-flop 141. Therefore, the timer output TOUT1 is switched from "0" to "1" as shown in FIG. 3C.

The above-mentioned state is repeated. That is, as shown in FIG. 3C, a state having a time period corresponding to the value TA of the comparison register 135 where the time output TOUT1 is "0" and a state having a time period corresponding to the value (TB-TA) corresponding to the difference in value between the comparison registers 135 and 137 where the timer output TOUT1 is "1", are alternately repeated.

Here, consider a system requiring two kinds of timer outputs (TOUT1 and TOUT2) as shown in FIGS. 4A and 4B, which are required for a current control system for printheads. In this case, when the first timer output TOUT1 is "0", the second timer output TOUT2 is inactive, i.e., "0" while, when the first timer output TOUT1 is "1", the second timer output TOUT2 is active, i.e., the second timer output TOUT2 is switched from "0" to "1" and vice versa.

Figure 5:
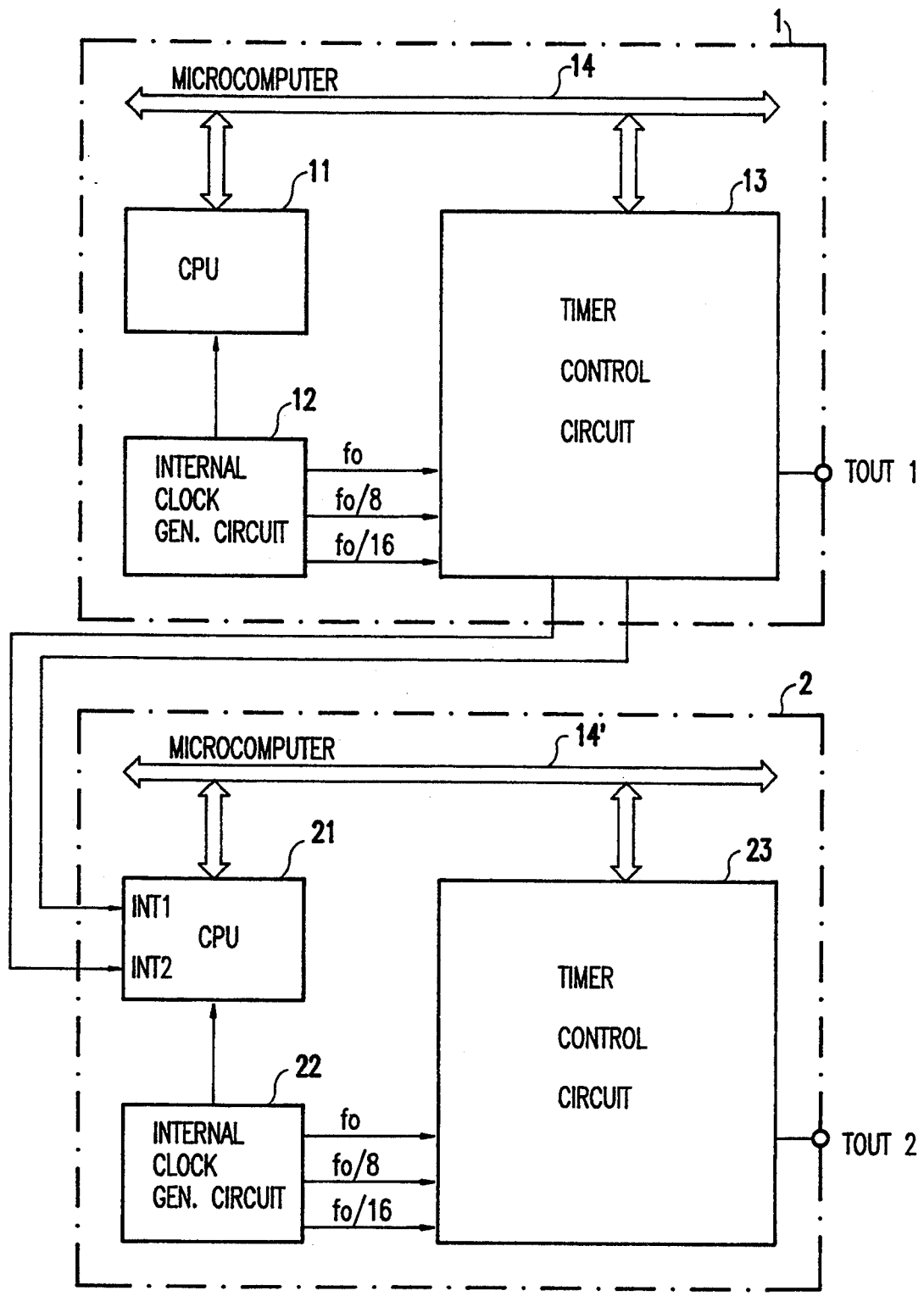
FIG. 5 is a block circuit diagram illustrating a prior art microcomputer system for generating the timer outputs of FIGS. 4A and 4B.

In FIG. 5, which illustrates a prior art microcomputer system for realizing the two kinds of timer outputs TOUT1 and TOUT2 as shown in FIG. 5, two single chip microcomputers 1 and 2, each of which has the same configuration as that of FIG. 1, are provided. In this case, values TA and TB (<TA) are set in the comparison registers of the timer control circuit 13 of the microcomputer 1, and values TC and TD (<TC) are set in the comparison registers of the timer control circuit 23 of the microcomputer 2.

In order to activate the second timer output TOUT2 only when the first timer output TOUT1 is "1", it is necessary for the CPU 21 of the microcomputer 2 to receive two kinds of interrupt signals from the timer control circuit 13 of the microcomputer 1. Note that a first interrupt signal occurs when the first timer output TOUT1 is switched from "0" to "1" (see: $t_1$, $t_3$, $t_5$, ... of FIG. 3C), and a second interrupt signal occurs when the first timer output TOUT1 is switched from "1" to "0" (see: $t_2$, $t_4$, $t_6$, ... of FIG. 3C).

However, in the system of FIG. 5, the manufacturing cost is high, since two single chip microcomputers are required. Also, since the two microcomputers 1 and 2 use different clock signals so that a time lag occurs in operation between the two microcomputers 1 and 2, an accurate phase relationship between the timer output TOUT1 and TOUT2 cannot be expected. Further, when one of the timer control circuits 13 and 23 changes the selection of the clock signals, the other also has to change the selection of the clock signals to maintain the count rate of the timer counters at the same value. This involves complex control.

Also, another external timer control circuit can only be added to the single chip microcomputer 1, instead of the second single chip microcomputer 2. However even in this case, when the internal timer control circuit changes the selection of the clock signals, the external timer control circuit also has to change the selection of the clock signals to maintain the count rate of the timer counters at the same value. This also involves complex control.

Figure 6:
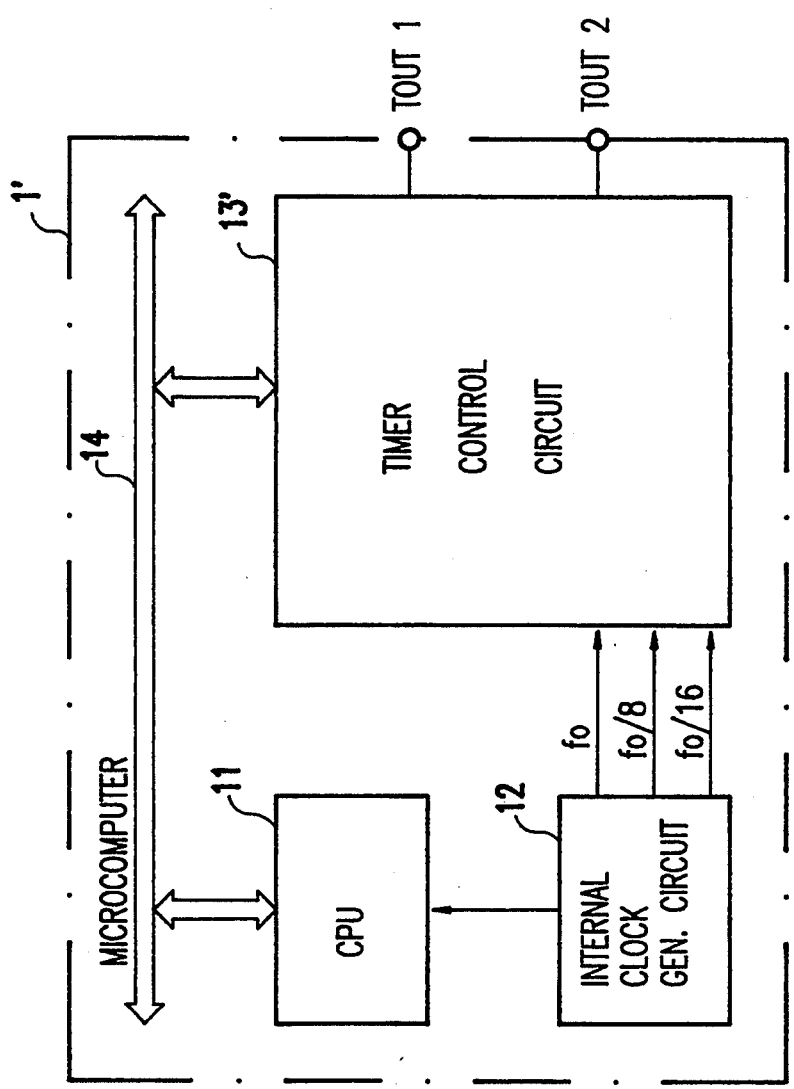
FIG. 6 is a block circuit diagram illustrating an embodiment of the single chip microcomputer according to the present invention.

In FIG. 6, which illustrates an embodiment of the present invention, only one single chip microcomputer 1' is provided for generating the two kinds of timer outputs TOUT1 and TOUT2 as shown in FIGS. 4A and 4B. In FIG. 6, a timer control circuit 13' includes two timer circuits therein for generating the two timer outputs TOUT1 and TOUT2. Therefore, the system for generating the two kinds of time outputs TOUT1 and TOUT2 is decreased in size to thereby reduce the cost. Also, the timer circuits receive the same clock signal, so that no time lag occurs in operation between the timer circuits.

Figure 7:
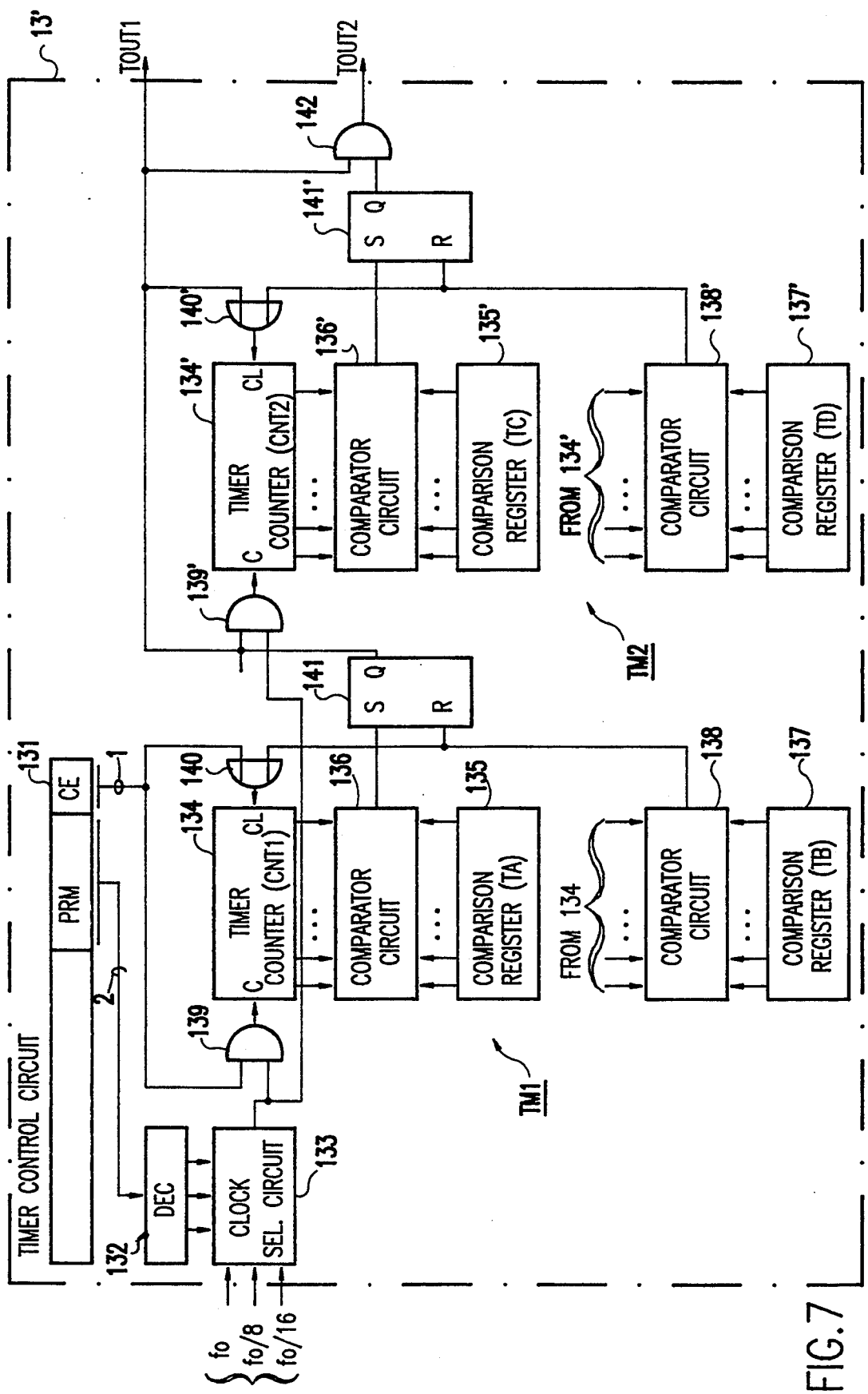
FIG. 7 is a detailed block circuit diagram of the timer control circuit of FIG. 6.

In FIG. 7, which is a detailed block circuit diagram of the timer control circuit 13' of FIG. 6, a timer circuit TM2 is added to the elements of the timer control circuit 13 of FIG. 2.

The timer circuit TM2 has a similar configuration to the timer circuit TM1. That is, the timer circuit TM2 includes a timer counter 134' for counting a time duration CNT2, a comparison register 135', a comparator circuit 136' for comparing the value (CNT2) of the timer counter 134' with the value (TC) of the comparison register 135', a comparison register 137', and a comparator circuit 138' for comparing the value (CNT2) of the timer counter 134' with the value (TD) of the comparison register 137'. The values TC and TD of the comparison registers 135' and 137' are also written by the CPU 11. The timer circuit TM2 further includes an AND circuit 142 which has two inputs connected to the outputs of the flip-flops 141 and 141'. Therefore, when the timer output TOUT1 is "0", the AND circuit 142 is disabled so that the timer output TOUT2 is inactive ("0"), while, when the timer output TOUT1 is "1", the AND circuit 142 is enabled so that the timer output TOUT2 is active (i.e., the timer output TOUT2 is switched from "0" to "1" or vice versa).

The operation of the timer control circuit 13' of FIG. 7 will be explained with reference to FIGS. 8A, 8B, 8C, 8D, and 8E. Before time t0, the processor mode data PRM of the control register 131 and the values TA and TB (<TA) are set in advance in the comparison registers 135 and 137 by the CPU 11, and, in addition, the values TC and TD (<TC) are set in advance in the comparison registers 135' and 137' by the CPU 11. Also, in this state, the timer output TOUT1 of the flip-flop 141 and the timer output TOUT2 of the flip-flop 141' are indefinite (i.e., undecided), since they depend on the state of the flip-flops 141 and 141', respectively. Further, in this state, the values CNT1 and CNT2 of the timer counters 134 and 134' are suspended, since the clock signal does not pass through the AND circuits 139 and 139'.

Figure 8:
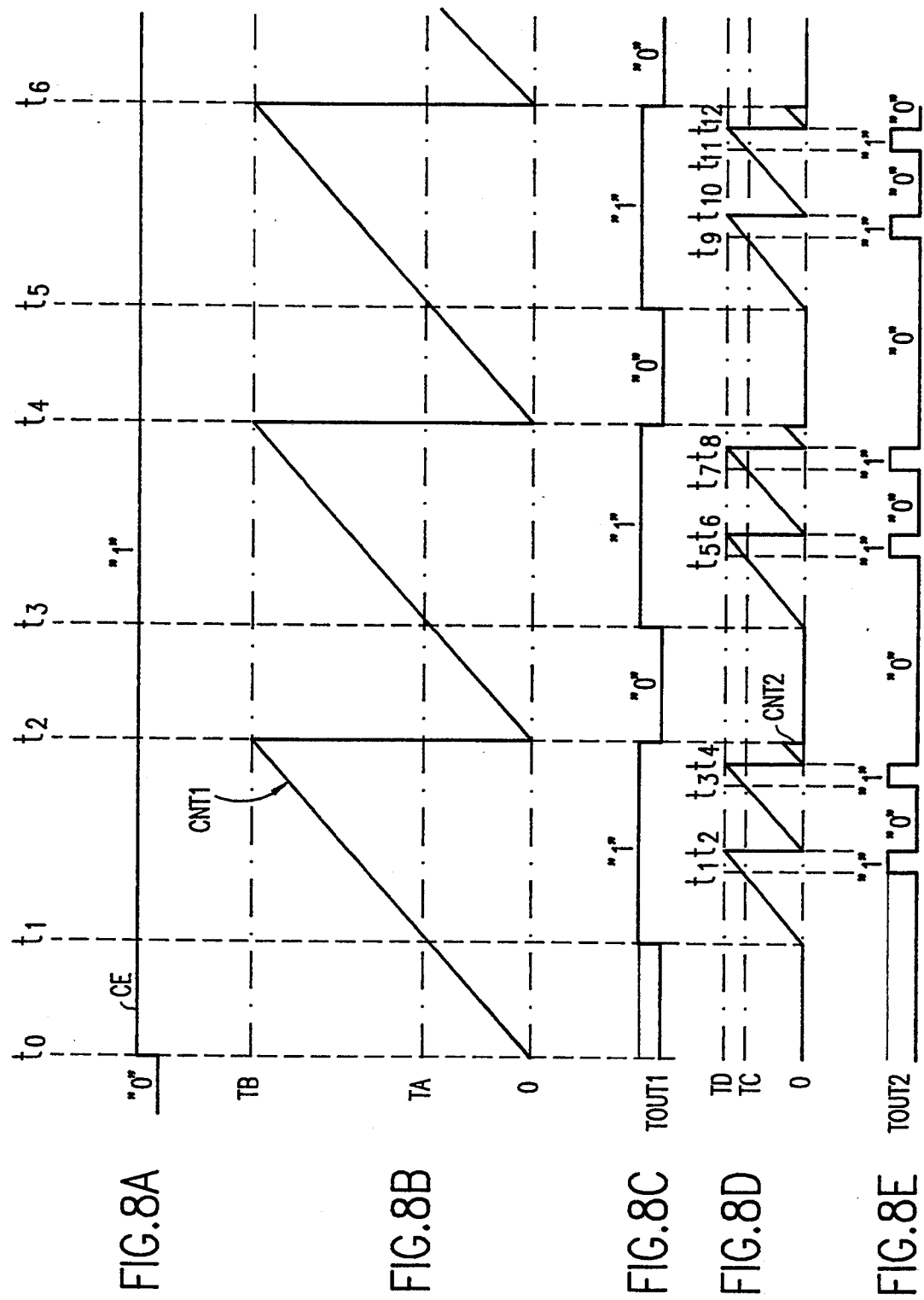
FIGS. 8A through 8E are timing diagrams showing the operation of the timer control circuit of FIG. 7.

At time t0, when the clock enable data CE of the control register 131 is switched from "0" to "1" as shown in FIG. 8A, the value CNT1 of the time counter 134 is cleared by the OR circuit 140, and the timer counter 134 initiates to count the selected clock signal via the AND circuit 139, as shown in FIG. 8B. At this time, in FIG. 8D, although the value CNT2 of the time counter 134' is 0, it is actually not always 0, and accordingly, the timer output TOUT2 is undecided as shown in FIG. 8E.

Before time t1, since the value CNT1 of the timer counter 134 does reach the value TA of the comparison register 135 as shown in FIG. 8B, the state of the flip-flop 141 is unchanged and remains in its previous state which is "0" or "1".

At time t1, the value CNT1 of the timer counter 134 reaches the value TA of the comparison register 135 as shown in FIG. 8B, so that the comparator circuit 136 generates a coincidence signal to set the flip-flop 141. Therefore, the timer output TOUT1 is determined to be "1", as shown in FIG. 8C. Simultaneously, if the timer output TOUT1 is switched from "0" to "1", the value CNT2 of the timer counter 134' is cleared by the OR circuit 140', and the timer counter 134' begins counting the selected clock signal via the AND circuit 139', as shown in FIG. 8D.

At time t1, the value CNT2 of the timer counter 134' reaches the value TC of the comparison register 135' as shown in FIG. 8D, so that the comparator circuit 136' generates a coincidence signal to set the flip-flop 141'. Therefore, the timer output TOUT2 is determined to be "1", as shown in FIG. 8E.

Before time t2', since the value CNT2 of the timer counter 134' does reach the value TD of the comparison register 137' as shown in FIG. 8D, the state of the flip-flop 141' is unchanged and remains in its previous state "1".

At time t2', the value CNT2 of the timer counter 134' reaches the value TD of the comparison register 135' as shown in FIG. 8D, so that the comparator circuit 138' generates a coincidence signal to reset the flip-flop 141'. Therefore, the timer output TOUT2 is switched from "1" to "0", as shown in FIG. 8E. Simultaneously, the value CNT2 of the timer counter 134' is cleared by the coincidence signal of the comparator circuit 138' via the OR circuit 140', as shown in FIG. 8D.

At time t3', the same operation that occurred at time t1' is carried out, and at time t4', the same operation that occurred at time t2' is carried out.

At time t2, the value CNT1 of the timer counter 134 again reaches the value TA of the comparison register 135 as shown in FIG. 8B, so that the comparator circuit 136 generates a coincidence signal to set the flip-flop 141. Therefore, the timer output TOUT1 is switched from "0" to "1", as shown in FIG. 8C. Simultaneously, the value CNT2 of the timer counter 134' is cleared by the OR circuit 140' as shown in FIG. 8D. However, the time counter 134' does not begin counting the selected clock signal as shown in FIG. 8D, since the AND circuit 139' is disabled by the state "0" of the flip-flop 141.

The above-mentioned state is repeated. That is, as shown in FIG. 8C, a state having a time period corresponding to the value TA of the comparison register 135 where the timer output TOUT1 is "0" and a state having a time period corresponding to the value (TB-TA) corresponding to the difference in value between the comparison registers 135 and 137 where the timer output TOUT1 is "1", are alternately repeated. In addition, when the timer output TOUT1 is active ("1"), a state having a time period corresponding to the value TC of the comparison register 135' where the timer output TOUT2 is "0" and a state having a time period corresponding to the value (TD-TC) corresponding to the difference in value between the comparison registers 135' and 137' where the timer output TOUT2 is "1", are alternately repeated.

Figure 9:
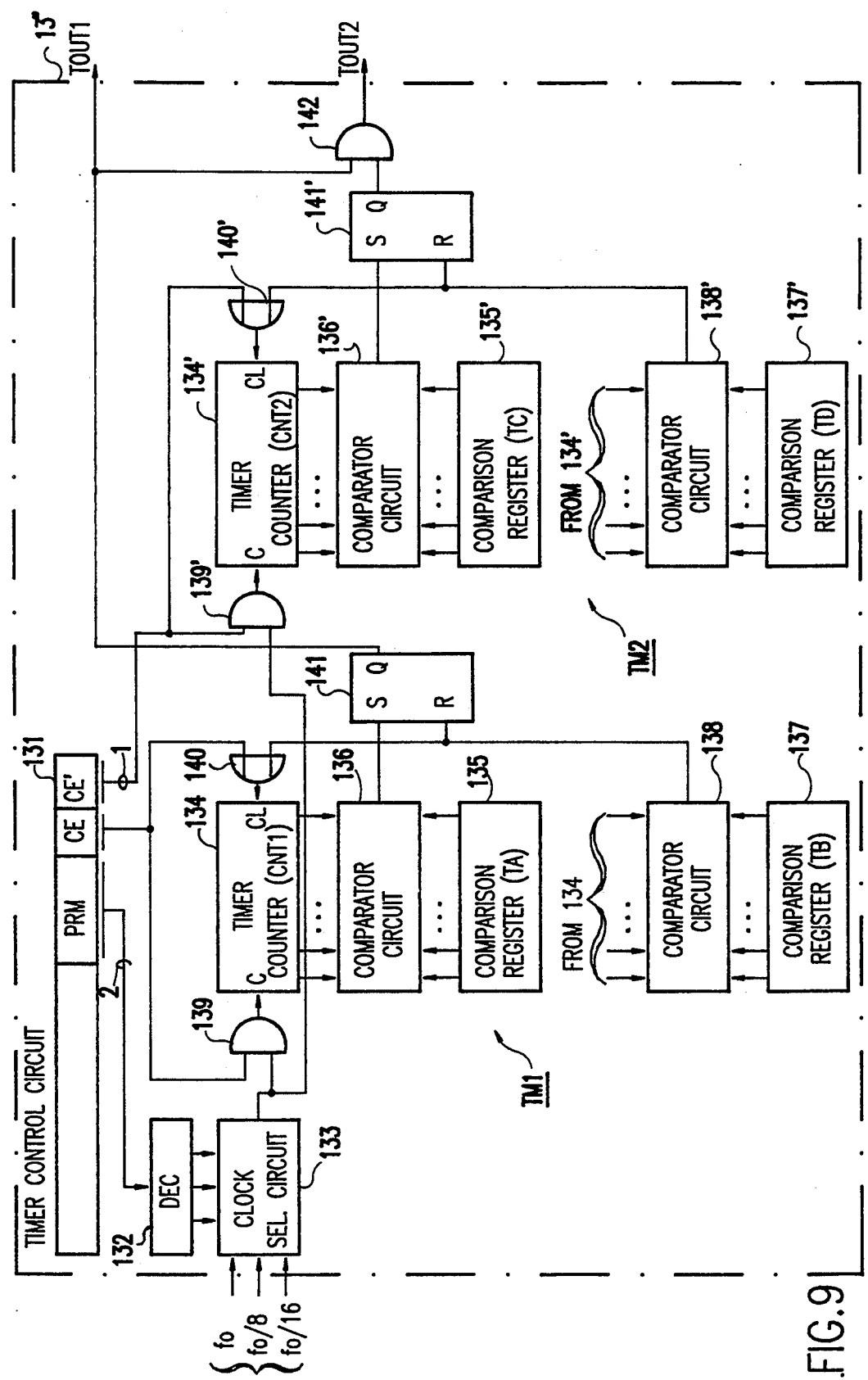
FIG. 9 is a block circuit diagram of a modification of the timer control circuit of FIG. 7.

In FIG. 9, which is a modification of the timer control circuit of FIG. 7, the control register 131 of FIG. 7 is modified to store another clock enable data CE'. Instead of the timer output TOUT1 of the flip-flop 141, the clock enable data CE' is supplied via the AND circuit 139' and the OR circuit 140' to the timer counter 134'. Thus, the operation of the timer circuit TM2 is independent of that of the timer circuit TM1, except that the state "0" of the flip-flop 141 (i.e., the timer output TOUT1 (="0")) disables the timer circuit TM2.

The operation of the timer control circuit 13" of FIG. 9 will be explained with reference to FIGS. 10A, 10B, 10C, 10D, 10E, and 10F. Before time $t_0$, the processor mode data PRM of the control register 131 and the values TA and TB (<TA) are set in advance in the comparison registers 135 and 137 by the CPU 11, and, in addition, the values TC and TD (<TC) are set in advance in the comparison registers 135' and 137' by the CPU 11. Also, in this state, the timer output TOUT1 of the flip-flop 141 and the timer output TOUT2 of the flip-flop 141' are indefinite (i.e., undecided), since they depend on the state of the flip-flops 141 and 141', respectively. Further, in this state, the values CNT1 and CNT2 of the timer counters 134 and 134' are suspended, since the clock signal does not pass through the AND circuits 139 and 139'.

Figure 10:
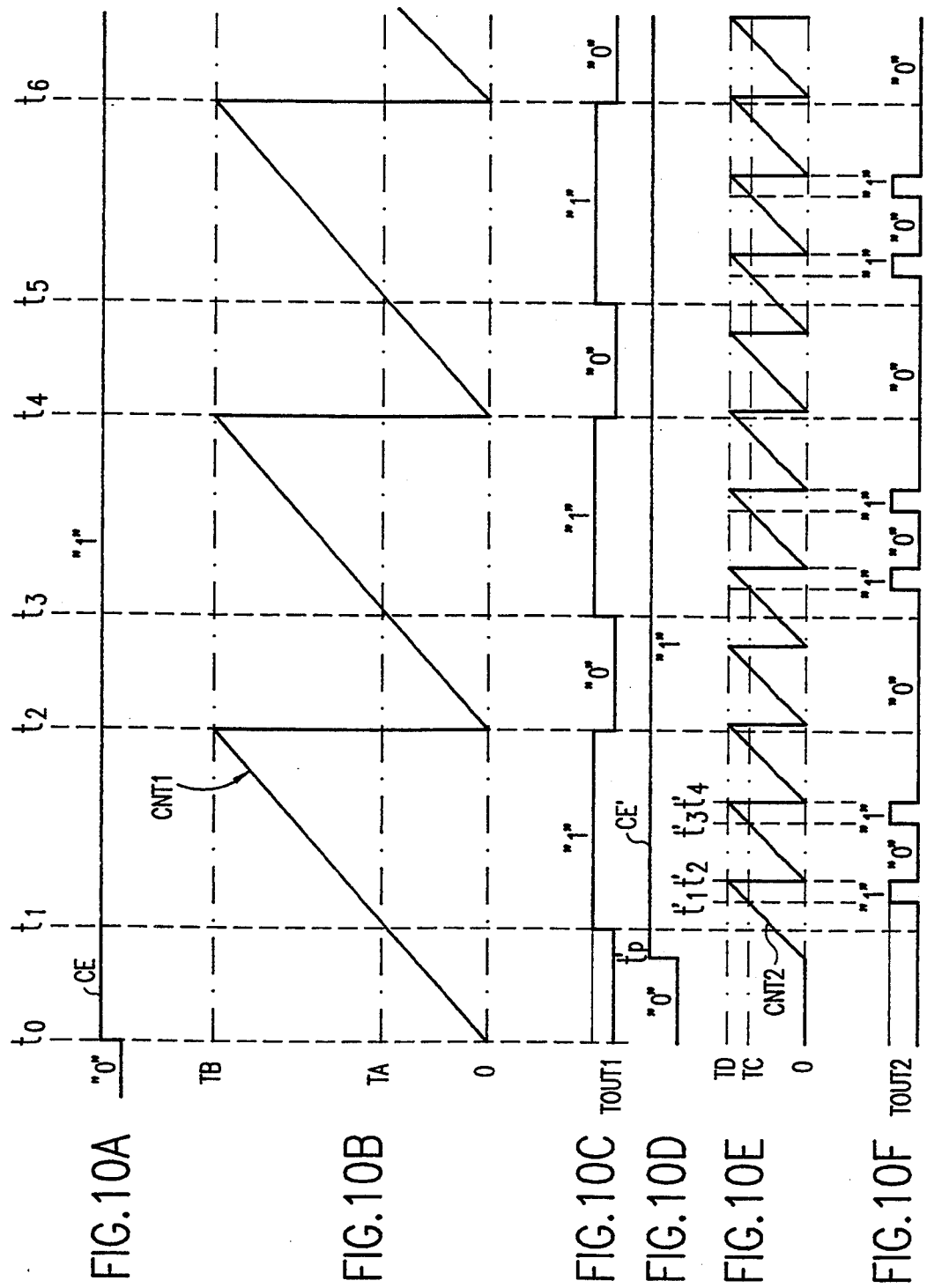
FIGS. 10A through 10F are timing diagrams showing the operation of the timer control circuit of FIG. 9.

At time $t_0$, when the clock enable data CE of the control register 131 is switched from "0" to "1" as shown in FIG. 10A, the value CNT1 of the timer counter 134 is cleared by the OR circuit 140, and the timer counter 134 begins counting the selected clock signal via the AND circuit 139, as shown in FIG. 8B.

After time $t_0$, as shown in FIGS. 10A, 10B, and 10C, the timer circuit TM1 operates in the same way as in FIGS. 8A and 8B, and the timer output TOUT1 is obtained in the same way as that shown in FIG. 8C is obtained.

At time $t_1'$, the value CNT2 of the timer counter 134' reaches the value TC of the comparison register 135' as shown in FIG. 10E, so that the comparator circuit 136' generates a coincidence signal to set the flip-flop 141'. Therefore, the timer output TOUT2 is determined to be "1", as shown in FIG. 10F.

At time $t_2'$, the value CNT2 of the timer counter 134' reaches the value TD of the comparison register 135' as shown in FIG. 10E, so that the comparator circuit 138' generates a coincidence signal to reset the flip-flop 141'. Therefore, the timer output TOUT2 is switched from "1" to "0", as shown in FIG. 10F. Simultaneously, the value CNT2 of the timer counter 134' is cleared by the coincidence signal of the comparator circuit 138' via the OR circuit 140', as shown in FIG. 10E.

At time $t_3'$, the same operation that occurred at time $t_1'$ is carried out, and at time $t_4'$, the same operation that occurred at time $t_2'$ is carried out.

The above-mentioned state is that repeated. That is, as shown in FIG. 10C, a state having a time period corresponding to the value TA of the comparison register 135 where the timer output TOUT1 is "0" and a state having a time period corresponding to the value (TB-TA) corresponding to the difference in value between the comparison registers 135 and 137 where the timer output TOUT1 is "1", are alternately repeated. In addition, when the timer output TOUT1 is active ("1"), a state having a time period corresponding to the value TC of the comparison register 135' where the timer output TOUT2 is "0" and a state having a time period corresponding to the value (TD-TC) corresponding to the difference in value between the comparison registers 135' and 137' where the timer output TOUT2 is "1", are alternately repeated.

In FIG. 9, with respect to the phase relationship, the timer output TOUT1 is independent of the timer output TOUT2. In other words, the phase relationship between the two timer outputs TOUT1 and TOUT2 can be adjusted by setting the clock enable data CE and CE' in the control register 131 with the aid of the CPU 11.

Figure 11:
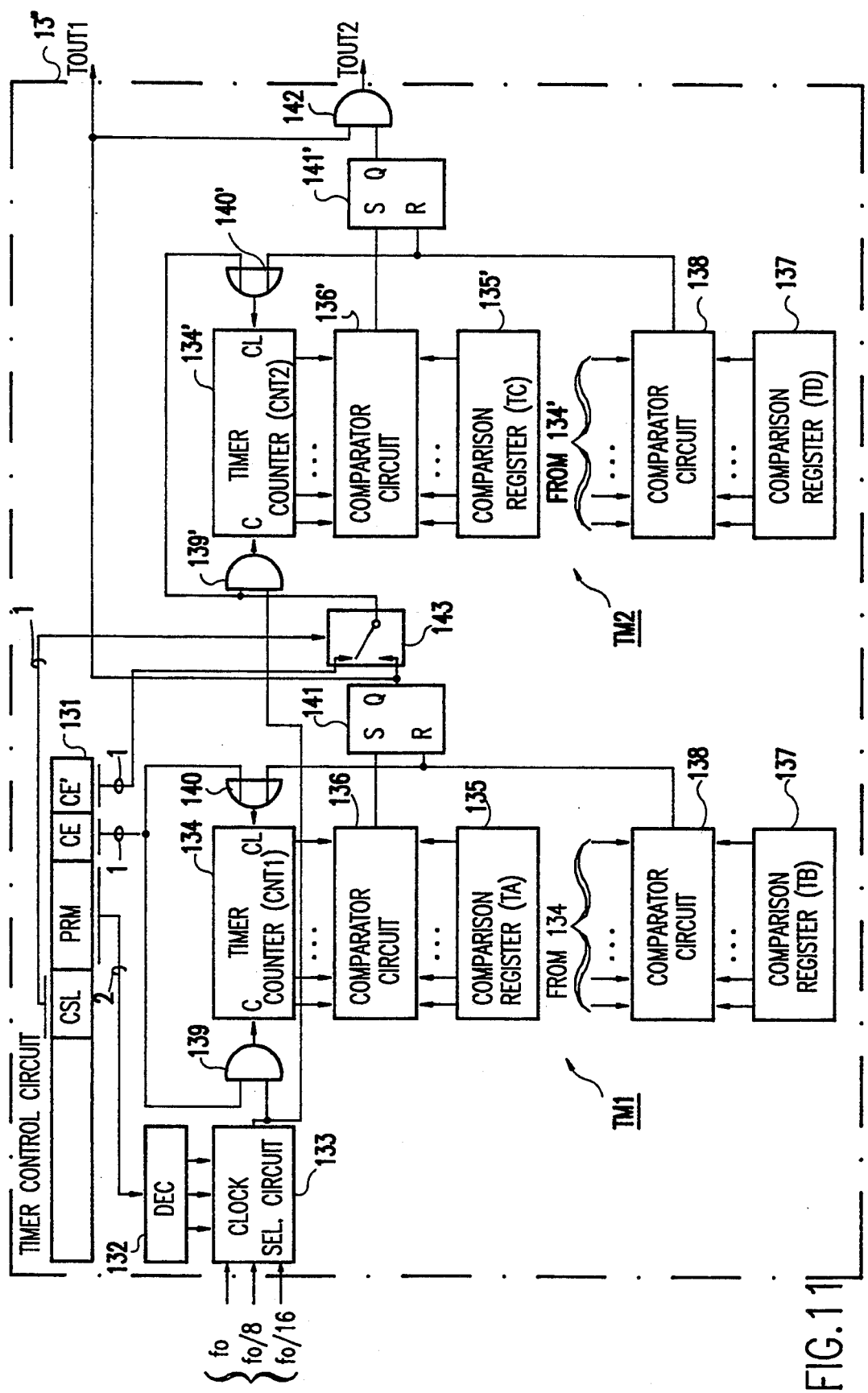
FIG. 11 is a block circuit diagram of another modification of the timer control circuit of FIG. 7.

In FIG. 11, which is another modification of the timer control circuit of FIG. 7 or 9, the timer control circuit 13' of FIG. 7 and the timer control circuit 13" of FIG. 9 are combined into a timer control circuit 13'''. That is, the control register 131 of FIG. 9 is modified to store 1-bit clock selection (CSL) data which is supplied to a selection circuit 143. Also, this clock selection data CSL is written by the CPU 11. The selection circuit 143 is interposed between the timer circuits TM1 and TM2. When the clock selection data CSL is "0", the selection circuit 143 remains in a state as indicated in FIG. 11, and accordingly, the clock enable data CE' is supplied via the AND circuit 139' and the OR circuit 140' to the timer counter 134'. Therefore, in this case, the timer control circuit 13''' of FIG. 11 operates as the timer control circuit 13" of FIG. 9. Conversely, when the clock selection data CSL is "1", the selection circuit 143 remains in an opposite state to the state as indicated in FIG. 11, and accordingly, the timer output TOUT1 is supplied via the AND circuit 139' and the OR circuit 140' to the timer counter 134'. Therefore, in this case, the timer control circuit 13''' of FIG. 11 operates as the timer control circuit 13' of FIG. 7. Thus, the microcomputer including the timer control circuit 13''' of FIG. 11 enhances the flexibility of the circuit as compared with the microcomputer having the timer control circuit 13' of FIG. 7 or the timer control circuit 13" of FIG. 9.

Figure 12:
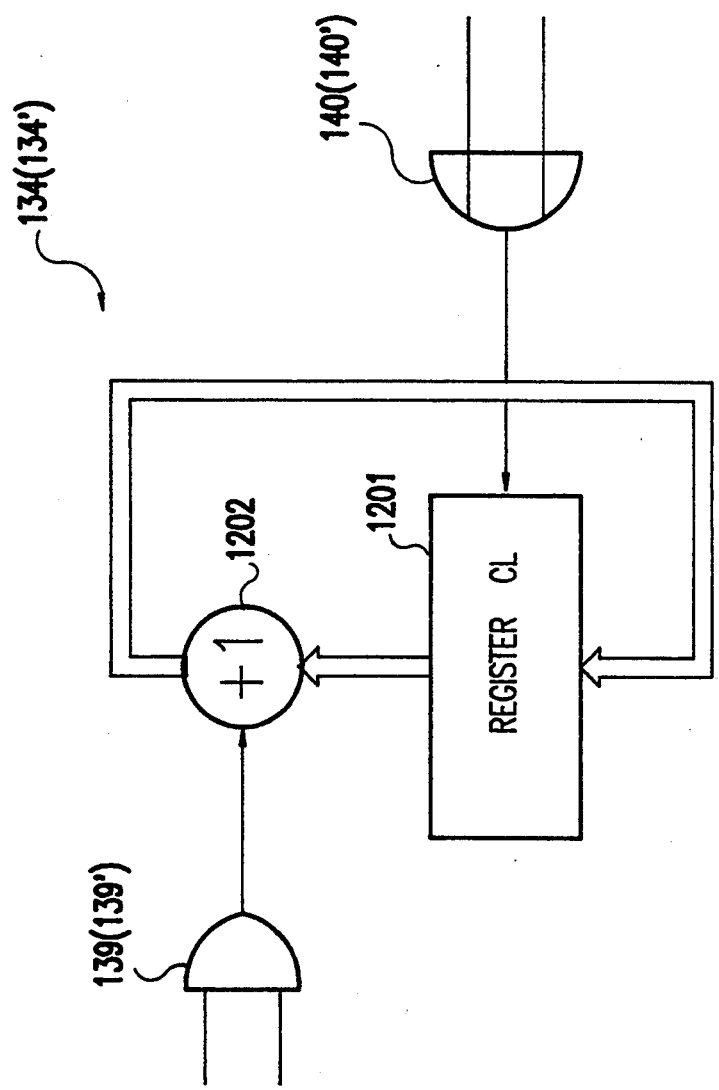
FIG. 12 is a circuit diagram of a modification of the timer counter of FIGS. 7, 9, and 11.

Although the timer counter 134(134') is formed by a series of binary counters having clear terminals as illustrated in FIG. 7, 9, or 11, the timer counter 134(134') can be formed by a register 1201 which has a clear terminal and a+1 incrementor 1202 which increments the content of the register 1201 by +1 when receiving a clock signal via the AND circuit 139(139'), as illustrated in FIG. 12.

As explained hereinbefore, according to the present invention, since use is made of only one single chip microcomputer for generating two kinds of timer outputs, the manufacturing cost thereof can be reduced. Also, since two timer functions incorporated into the single chip microcomputer use the same clock signal, no time lag in operation between the two timer functions exists, and as a result, an accurate phase relationship between the two timer functions can be obtained.

I claim:

1. A single chip microcomputer comprising:
   clock signal generating means for generating at least one clock signal having a predetermined frequency;
   first counting means, operatively connected to said clock signal generating means, for counting said clock signal;
   first timer signal generating means, connected to said first counting means, for generating a first timer signal which changes from one of first binary logic states to the other of said first binary logic states when the value of said first counting means reaches a first predetermined value and changes from said other of said first binary logic states to said one of said first binary logic states when the value of said first counting means reaches a second predetermined value;
   second counting means, operatively connected to said clock signal generating means, for counting said clock signal; and second timer signal generating means connected to said second counting means and said first timer signal generating means, for generating a second timer signal which changes from one of second binary logic states to the other of said second binary logic states when the value of said second counting means reaches a third predetermined value and changes from said other of said second binary logic states to said one of said second binary logic states when the value of said second counting means reaches a fourth predetermined value; and means for deactivating said second timer signal generating means during said first timer signal being in said one of said first binary logic states.

2. A single chip microcomputer as set forth in claim 1, wherein said second counting means is connected to said first timer signal generating means, to disable said second counting means during said first timer signal being in said one of said first binary logic states.

3. A single chip microcomputer as set forth in claim 2, further comprising selection means, connected between said first timer signal generating means and said second counting means, for selectively connecting said second counting means to said first timer signal generating means.

4. A single chip microcomputer as set forth in claim 1, further comprising first enabling means, connected between said clock signal generating means and said first counting means, for enabling and disabling said first counting means.

5. A single chip microcomputer as set forth in claim 4, further comprising first clock enable data storing means, connected to said first enabling/disabling means, for storing first clock enable data, said first enabling/disabling means enabling and disabling said first counting means in accordance with said first clock enable data.

6. A single chip microcomputer as set forth in claim 5, wherein said first counting means is cleared when the first clock enable data stored in said first clock data storing means is switched from an inactive state to an active state.

7. A single chip microcomputer as set forth in claim 1, further comprising second enabling/disabling means, connected between said clock signal generating means and said second counting means, for enabling and disabling said second counting means.

8. A single chip microcomputer as set forth in claim 7, further comprising second clock enable data storing means, connected to said second enabling/disabling means, for storing second clock enable data, said second enabling/disabling means enabling and disabling said second counting means in accordance with said second clock enable data.

9. A single chip microcomputer as set forth in claim 8, wherein said second counting means is cleared when the second clock enable data stored in said second clock data storing means is switched from an inactive state to an active state.

10. A single chip microcomputer as set forth in claim 1, wherein each of said first and second counting means comprises:
   a register; and
   an incremental circuit, connected to said register, for incrementing the value of said register by +1 when receiving said clock signal.

11. A single chip microcomputer according to claim 1, wherein said first timer signal generating means comprises a first comparator circuit, connected to said first counting means, for generating a coincidence signal when the value of said first counting means reaches the first predetermined value.

12. A single chip microcomputer according to claim 11, wherein said first timer signal generating means further comprises a second comparator circuit, connected to said first counting means, for generating a coincidence signal when the value of said first counting means reaches the second predetermined value stored.

13. A single chip microcomputer according to claim 1, wherein said second timer signal generating means comprises a third comparator circuit, connected to said second counting means, for generating a coincidence signal when the value of said second counting means reaches the third predetermined value.

14. A single chip microcomputer according to claim 13, wherein said second timer signal generating means further comprises a fourth comparator circuit, connected to said second counting means, for generating a coincidence signal when the value of said second counting means reaches the fourth predetermined value.

15. A single chip microcomputer comprising:
   clock signal generating means for generating at least one clock signal having a predetermined frequency;
   first counting means, operatively connected to said clock signal generating means, for counting said clock signal;
   first timer signal generating means, connected to said first counting means, for generating a first timer signal which changes from one of first binary logic states to the other of said first binary logic states when the value of said first counting means reaches a first predetermined value and changes from said other of said first binary logic states to said one of said first binary logic states when the value of said first counting means reaches a second predetermined value;
   second counting means, operatively connected to said clock signal generating means, for counting said clock signal; and
   second timer signal generating means connected to said second counting means and said first timer signal generating means, for generating a second timer signal which changes from one of second binary logic states to the other of said second binary logic states when the value of said second counting means reaches a third predetermined value and changes from said other of said second binary logic states to said one of said second binary logic states when the value of said second counting means reaches a fourth predetermined value;
   means for deactivating said second timer signal generating means during said first timer signal being in said one of said first binary logic states;
   selection means, connected between said first timer signal generating means and said second counting means, for selectively connecting said second counting means to said first timer signal generating means; and
   selection data storing means, connected to said selection means, for storing selection data, said selection means selectively connecting said second counting means to said first timer signal generating means in accordance with the selection data stored in said selection data storing means.

16. A single chip microcomputer comprising:

clock signal generating means for generating at least one clock signal having a predetermined frequency;

first counting means, operatively connected to said clock signal generating means, for counting said clock signal;

first timer signal generating means, connected to said first counting means, for generating a first timer signal which changes from one of first binary logic states to the other of said first binary logic states when the value of said first counting means reaches a first predetermined value and changes from said other of said first binary logic states to said one of said first binary logic states when the value of said first counting means reaches a second predetermined value;

second counting means, operatively connected to said clock signal generating means, for counting said clock signal;

second timer signal generating means connected to said second counting means and said first timer signal generating means, for generating a second timer signal which changes from one of second binary logic states to the other of said second binary logic states when the value of said second counting means reaches a third predetermined value and changes from said other of said second binary logic states to said one of said second binary logic states when the value of said second counting means reaches a fourth predetermined value; and means for deactivating said second timer signal generating means during said first timer signal being in said one of said first binary logic states, wherein said first timer signal generating means comprises:
- a first comparison register for storing said first predetermined value;
- a first comparator circuit, connected to said first comparison register and to said first counting means, for generating a coincidence signal when the value of said first counting means reaches the first predetermined value stored in said first comparison register;
- a second comparison register for storing said second predetermined value;
- a second comparator circuit, connected to said second comparison register and to said first counting means, for generating a coincidence signal when the value of said first counting means reaches the second predetermined value stored in said second comparison register; and
- a first hold circuit, connected to said first and second comparator circuits, for generating said first timer signal, said first hold circuit being set by the coincidence signal of said first comparator circuit and reset by the coincidence signal of said second comparator circuit.

17. A single chip microcomputer as set forth in claim 16, wherein said first counting means is cleared by the coincidence signal of said second comparator circuit.

18. A single chip microcomputer comprising:

clock signal generating means for generating at least one clock signal having a predetermined frequency;

first counting means, operatively connected to said clock signal generating means, for counting said clock signal;

first timer signal generating means, connected to said first counting means, for generating a first timer signal which changes from one of first binary logic states to the other of said first binary logic states when the value of said first counting means reaches a first predetermined value and changes from said other of said first binary logic states to said one of said first binary logic states when the value of said first counting means reaches a second predetermined value;

second counting means, operatively connected to said clock signal generating means, for counting said clock signal;

second timer signal generating means connected to said second counting means and said first timer signal generating means, for generating a second timer signal which changes from one of second binary logic states to the other of said second binary logic states when the value of said second counting means reaches a third predetermined value and changes from said other of said second binary logic states to said one of said second binary logic states when the value of said second counting means reaches a fourth predetermined value; and means for deactivating said second timer signal generating means during said first timer signal being in said one of said first binary logic states, wherein said second timer signal generating means comprises:
- a third comparison register for storing said third predetermined value;
- a third comparator circuit, connected to said third comparison register and to said second counting means, for generating a coincidence signal when the value of said second counting means reaches the third predetermined value stored in said third comparison register;
- a fourth comparison register for storing said fourth predetermined value;
- a fourth comparator circuit, connected to said fourth comparison register and to said second counting means, for generating a coincidence signal when the value of said second counting means reaches the fourth predetermined value stored in the fourth comparison register;
- a second hold circuit, connected to said third and fourth comparator circuits, for generating said second timer signal, said second hold circuit being set by the coincidence signal of said first comparator circuit and reset by the coincidence signal of said second comparator circuit; and
- a disabling circuit, connected to said second hold circuit and said first timer signal generating means, for disabling said second hold circuit when the first timer signal of said first timer signal generating means is being reset, thereby said second timer signal being inactive.

19. A single chip microcomputer as set forth in claim 18, wherein said second counting means is cleared by the coincidence signal of said fourth comparator circuit.

20. A single chip microcomputer comprising:

clock signal generating means for generating at least one clock signal having a predetermined frequency;

first counting means, operatively connected to said clock signal generating means, for counting said clock signal;

first timer signal generating means, connected to said first counting means, for generating a first timer signal which changes from one of first binary logic states to the other of said first binary logic states when the value of said first counting means reaches a first predetermined value and changes from said other of said first binary logic states to said one of said first binary logic states when the value of said first counting means reaches a second predetermined value;

second counting means, operatively connected to said clock signal generating means, for counting said clock signal;

second timer signal generating means connected to said second counting means and said first timer signal generating means, for generating a second timer signal which changes from one of second binary logic states to the other of said second binary logic states when the value of said second counting means reaches a third predetermined value and changes from said other of said second binary logic states to said one of said second binary logic states when the value of said second counting means reaches a fourth predetermined value;

means for deactivating said second timer signal generating means during said first timer signal being in said one of said first binary logic states; and mode bit storing means, connected to said clock signal generating means, for storing mode bit data, said clock signal generating means selectively generating said clock signal which has a frequency dependent upon said mode bit data.

* * * * *